(12) United States Patent
Gopalakrishna

(10) Patent No.: US 11,869,076 B2
(45) Date of Patent: Jan. 9, 2024

(54) REDUCING WORKLOAD USING TRANSACTION AGGREGATION

(71) Applicant: LendingClub Corporation, San Francisco, CA (US)

(72) Inventor: Shanmughavadivelu Gopalakrishna, Cupertino, CA (US)

(73) Assignee: LENDINGCLUB BANK, NATIONAL ASSOCIATION, Lehi, UT (US)

( * ) Notice: Subject to any disclaimer, the term of this patent is extended or adjusted under 35 U.S.C. 154(b) by 1452 days.

(21) Appl. No.: 15/887,751

(22) Filed: Feb. 2, 2018

(65) Prior Publication Data
US 2019/0244286 A1 Aug. 8, 2019

(51) Int. Cl.
*G06Q 40/03* (2023.01)
*G06Q 20/36* (2012.01)

(52) U.S. Cl.
CPC .............. *G06Q 40/03* (2023.01); *G06Q 20/36* (2013.01)

(58) Field of Classification Search
CPC ............................ G06Q 40/025; G06Q 20/36
USPC ........................................................... 705/38
See application file for complete search history.

(56) References Cited

U.S. PATENT DOCUMENTS

| | | | | |
|---|---|---|---|---|
| 7,665,658 B2 * | 2/2010 | Fields | ............... | G06Q 30/06 235/487 |
| 8,260,705 B1 * | 9/2012 | Bent | ............... | G06Q 40/06 705/40 |
| 8,584,936 B2 * | 11/2013 | Fiebiger | ............... | G06Q 20/40 235/379 |
| 2002/0111876 A1 * | 8/2002 | Rudraraju | ............... | G06Q 30/06 709/206 |
| 2005/0027648 A1 * | 2/2005 | Knowles | ............... | G06Q 40/12 705/38 |
| 2006/0224399 A1 * | 10/2006 | Alkemper | ............... | G06Q 10/06 705/41 |

(Continued)

OTHER PUBLICATIONS

Patrick Taylor, Inside Threats: System-Based, Sep./Oct. 2004, Thompson Reuters (Tax & Accounting) Inc., Internal Auditing, vol. 19, issue 5, pp. 3-11, 7 pages. (Year: 2004).*

*Primary Examiner* — Benjamin S Brindley
(74) *Attorney, Agent, or Firm* — Hickman Becker Bingham Ledesma LLP

(57) ABSTRACT

Techniques are described for reducing the number of transactions required to perform operations for services that support many-to-many relationships between entities. A one-to-many operation that involves an entity of a first type and multiple entities of a second type may be performed in two asynchronous phases: a one-to-intermediary phase and an intermediary-to-many phase. During the one-to-intermediary phase, a single transaction is performed between the entity of the first type and an intermediary. During the intermediary-to-many phase, a distinct transaction is performed between the intermediary and each of the entities of the second type that are involved in the one-to-many operation. The transaction performed for a particular entity of the second type during the intermediary-to-many phase may aggregate all changes that affect the particular entity, thereby significantly reducing the number of transactions performed by the system. The reduction in the number of transactions produces a variety of benefits, including both a reduction in computational overhead and a reduction in storage space consumption.

18 Claims, 9 Drawing Sheets

LOAN-TO-NOTES TABLE 200

| ORDER ID | LOAN ID | NOTE ID | AMOUNT | RECEIVED |
|---|---|---|---|---|
| 1 | L1 | N1 | 2500 | |
| 2 | L1 | N2 | 2500 | |
| 3 | L1 | N3 | 5000 | |
| 4 | L2 | N4 | 10000 | |

LOAN TABLE 202

| LOAN ID | AMOUNT |
|---|---|
| L1 | $10,000 |
| L2 | $10,000 |

ORDER TABLE 204

| ORDER ID | ACTOR | AMOUNT |
|---|---|---|
| 1 | I1 | 2500 |
| 2 | I2 | 2500 |
| 3 | I3 | 5000 |
| 4 | I1 | 10000 |

ACCOUNTS TABLE 208

| INVESTOR/ BORROWER | BALANCE |
|---|---|
| I1 | 0 |
| I2 | 100 |
| I3 | 150 |
| WALLET | 0 |
| B1 | 0 |
| B2 | 100 |

TRANSACTION TABLE 206

| TXN ID | TYPE | AMOUNT | FROM | TO | FROM BALANCE | TO BALANCE |
|---|---|---|---|---|---|---|
| | | | | | | |
| | | | | | | |
| | | | | | | |

PAYMENT DISTRIBUTION TABLE 210

| LOAN ID | NOTE ID | PR. | INT. | B-TXN | I-TXN | STATUS |
|---|---|---|---|---|---|---|
| | | | | | | |
| | | | | | | |
| | | | | | | |

(56) References Cited

U.S. PATENT DOCUMENTS

| | | | | |
|---|---|---|---|---|
| 2006/0294003 | A1* | 12/2006 | Snyder | G06Q 40/00 705/38 |
| 2007/0061223 | A1* | 3/2007 | Rodriguez | G06Q 30/0605 705/26.8 |
| 2010/0121758 | A1* | 5/2010 | Weiss | G06Q 40/04 705/37 |
| 2010/0241539 | A1* | 9/2010 | Baker | G06Q 50/16 705/34 |
| 2012/0253852 | A1* | 10/2012 | Pourfallah | G06Q 20/36 705/41 |
| 2013/0006648 | A1* | 1/2013 | O'Sullivan | H04L 41/5041 705/1.1 |
| 2013/0066779 | A1* | 3/2013 | Coyle | G06Q 40/00 705/44 |
| 2013/0085910 | A1* | 4/2013 | Chew | G06Q 40/02 705/30 |
| 2014/0172679 | A1* | 6/2014 | Shimko | G06Q 40/025 705/38 |
| 2017/0005804 | A1* | 1/2017 | Zinder | H04L 63/123 |
| 2018/0349776 | A1* | 12/2018 | Raamadhurai | G06N 5/025 |
| 2019/0156415 | A1* | 5/2019 | Yen | G06Q 40/06 |

* cited by examiner

LOAN-TO-NOTES TABLE 200

| ORDER ID | LOAN ID | NOTE ID | AMOUNT | RECEIVED |
|---|---|---|---|---|
| 1 | L1 | N1 | 2500 | |
| 2 | L1 | N2 | 2500 | |
| 3 | L1 | N3 | 5000 | |
| 4 | L2 | N4 | 10000 | |

LOAN TABLE 202

| LOAN ID | AMOUNT |
|---|---|
| L1 | $10,000 |
| L2 | $10,000 |

ORDER TABLE 204

| ORDER ID | ACTOR | AMOUNT |
|---|---|---|
| 1 | I1 | 2500 |
| 2 | I2 | 2500 |
| 3 | I3 | 5000 |
| 4 | I1 | 10000 |

ACCOUNTS TABLE 208

| INVESTOR/BORROWER | BALANCE |
|---|---|
| I1 | 0 |
| I2 | 100 |
| I3 | 150 |
| WALLET | 0 |
| B1 | 0 |
| B2 | 100 |

TRANSACTION TABLE 206

| TXN ID | TYPE | AMOUNT | FROM | TO | FROM BALANCE | TO BALANCE |
|---|---|---|---|---|---|---|
| | | | | | | |
| | | | | | | |
| | | | | | | |
| | | | | | | |

PAYMENT DISTRIBUTION TABLE 210

| LOAN ID | NOTE ID | PR. | INT. | B-TXN | I-TXN | STATUS |
|---|---|---|---|---|---|---|
| | | | | | | |
| | | | | | | |
| | | | | | | |
| | | | | | | |

FIG. 2

LOAN-TO-NOTES TABLE 200

| ORDER ID | LOAN ID | NOTE ID | AMOUNT | RECEIVED |
|---|---|---|---|---|
| 1 | L1 | N1 | 2500 | |
| 2 | L1 | N2 | 2500 | |
| 3 | L1 | N3 | 5000 | |
| 4 | L2 | N4 | 10000 | |

LOAN TABLE 202

| LOAN ID | AMOUNT |
|---|---|
| L1 | $10,000 |
| L2 | $10,000 |

ORDER TABLE 204

| ORDER ID | ACTOR | AMOUNT |
|---|---|---|
| 1 | I1 | 2500 |
| 2 | I2 | 2500 |
| 3 | I3 | 5000 |
| 4 | I1 | 10000 |

ACCOUNTS TABLE 208

| INVESTOR/BORROWER | BALANCE |
|---|---|
| I1 | 0 |
| I2 | 100 |
| I3 | 150 |
| WALLET | 0 |
| B1 | 100 |
| B2 | 100 |

TRANSACTION TABLE 206

| TXN ID | TYPE | AMOUNT | FROM | TO | FROM BALANCE | TO BALANCE |
|---|---|---|---|---|---|---|
| 1 | ACH | 100 | B1 | B1 | 100 | 100 |
| | | | | | | |
| | | | | | | |
| | | | | | | |

300

PAYMENT DISTRIBUTION TABLE 210

| LOAN ID | NOTE ID | PR. | INT. | B-TXN | I-TXN | STATUS |
|---|---|---|---|---|---|---|
| | | | | | | |
| | | | | | | |
| | | | | | | |
| | | | | | | |

FIG. 3A

LOAN-TO-NOTES TABLE 200

| ORDER ID | LOAN ID | NOTE ID | AMOUNT | RECEIVED |
|---|---|---|---|---|
| 1 | L1 | N1 | 2500 | |
| 2 | L1 | N2 | 2500 | |
| 3 | L1 | N3 | 5000 | |
| 4 | L2 | N4 | 10000 | |

LOAN TABLE 202

| LOAN ID | AMOUNT |
|---|---|
| L1 | $10,000 |
| L2 | $10,000 |

ORDER TABLE 204

| ORDER ID | ACTOR | AMOUNT |
|---|---|---|
| 1 | I1 | 2500 |
| 2 | I2 | 2500 |
| 3 | I3 | 5000 |
| 4 | I1 | 10000 |

ACCOUNTS TABLE 208

| INVESTOR/BORROWER | BALANCE |
|---|---|
| I1 | 0 |
| I2 | 100 |
| I3 | 150 |
| WALLET | 0 |
| B1 | 0 |
| B2 | 100 |

TRANSACTION TABLE 206

| TXN ID | TYPE | AMOUNT | FROM | TO | FROM BALANCE | TO BALANCE |
|---|---|---|---|---|---|---|
| 1 | ACH | 100 | B1 | B1 | 100 | 100 |
| 2 | LOAN-P | 100 | B1 | WALLET | 0 | 100 |
| | | | | | | |
| | | | | | | |

◄─302

PAYMENT DISTRIBUTION TABLE 210

| LOAN ID | NOTE ID | PR. | INT. | B-TXN | I-TXN | STATUS |
|---|---|---|---|---|---|---|
| L1 | 1 | 20 | 5 | 2 | | | ◄─350
| L1 | 2 | 20 | 5 | 2 | | | ◄─352
| L1 | 3 | 40 | 10 | 2 | | | ◄─354
| | | | | | | |

FIG. 3B

LOAN-TO-NOTES TABLE 200

| ORDER ID | LOAN ID | NOTE ID | AMOUNT | RECEIVED |
|---|---|---|---|---|
| 1 | L1 | N1 | 2500 | |
| 2 | L1 | N2 | 2500 | |
| 3 | L1 | N3 | 5000 | |
| 4 | L2 | N4 | 10000 | |

LOAN TABLE 202

| LOAN ID | AMOUNT |
|---|---|
| L1 | $10,000 |
| L2 | $10,000 |

ACCOUNTS TABLE 208

| INVESTOR/BORROWER | BALANCE |
|---|---|
| I1 | 0 |
| I2 | 100 |
| I3 | 150 |
| WALLET | 200 |
| B1 | 0 |
| B2 | 100 |

ORDER TABLE 204

| ORDER ID | ACTOR | AMOUNT |
|---|---|---|
| 1 | I1 | 2500 |
| 2 | I2 | 2500 |
| 3 | I3 | 5000 |
| 4 | I1 | 10000 |

TRANSACTION TABLE 206

| TXN ID | TYPE | AMOUNT | FROM | TO | FROM BALANCE | TO BALANCE |
|---|---|---|---|---|---|---|
| 1 | ACH | 100 | B1 | B1 | 100 | 100 |
| 2 | L-PAY | 100 | B1 | WALLET | 0 | 100 |
| 3 | ACH | 100 | B2 | B2 | 100 | 100 |
| | | | | | | |

PAYMENT DISTRIBUTION TABLE 210

| LOAN ID | NOTE ID | PR. | INT. | B-TXN | I-TXN | STATUS |
|---|---|---|---|---|---|---|
| L1 | 1 | 20 | 5 | 2 | | |
| L1 | 2 | 20 | 5 | 2 | | |
| L1 | 3 | 40 | 10 | 2 | | |
| | | | | | | |

FIG. 3C

LOAN-TO-NOTES TABLE 200

| ORDER ID | LOAN ID | NOTE ID | AMOUNT | RECEIVED |
|---|---|---|---|---|
| 1 | L1 | N1 | 2500 | |
| 2 | L1 | N2 | 2500 | |
| 3 | L1 | N3 | 5000 | |
| 4 | L2 | N4 | 10000 | |

LOAN TABLE 202

| LOAN ID | AMOUNT |
|---|---|
| L1 | $10,000 |
| L2 | $10,000 |

ORDER TABLE 204

| ORDER ID | ACTOR | AMOUNT |
|---|---|---|
| 1 | I1 | 2500 |
| 2 | I2 | 2500 |
| 3 | I3 | 5000 |
| 4 | I1 | 10000 |

ACCOUNTS TABLE 208

| INVESTOR/ BORROWER | BALANCE |
|---|---|
| I1 | 0 |
| I2 | 100 |
| I3 | 150 |
| WALLET | 200 |
| B1 | 0 |
| B2 | 100 |

TRANSACTION TABLE 206

| TXN ID | TYPE | AMOUNT | FROM | TO | FROM BALANCE | TO BALANCE |
|---|---|---|---|---|---|---|
| 1 | ACH | 100 | B1 | B1 | 100 | 100 |
| 2 | L-PAY | 100 | B1 | WALLET | 0 | 100 |
| 3 | ACH | 100 | B2 | B2 | 100 | 100 |
| 4 | L-PAY | 100 | B2 | WALLET | 100 | 200 |

PAYMENT DISTRIBUTION TABLE 210

| LOAN ID | NOTE ID | PR. | INT. | B-TXN | I-TXN | STATUS |
|---|---|---|---|---|---|---|
| | | | | | | |
| | | | | | | |
| | | | | | | |
| | | | | | | |

FIG. 3D

LOAN-TO-NOTES TABLE 200

| ORDER ID | LOAN ID | NOTE ID | AMOUNT | RECEIVED |
|---|---|---|---|---|
| 1 | L1 | N1 | 2500 | |
| 2 | L1 | N2 | 2500 | |
| 3 | L1 | N3 | 5000 | |
| 4 | L2 | N4 | 10000 | |

LOAN TABLE 202

| LOAN ID | AMOUNT |
|---|---|
| L1 | $10,000 |
| L2 | $10,000 |

ORDER TABLE 204

| ORDER ID | ACTOR | AMOUNT |
|---|---|---|
| 1 | I1 | 2500 |
| 2 | I2 | 2500 |
| 3 | I3 | 5000 |
| 4 | I1 | 10000 |

ACCOUNTS TABLE 208

| INVESTOR/BORROWER | BALANCE |
|---|---|
| I1 | 125 |
| I2 | 100 |
| I3 | 150 |
| WALLET | 75 |
| B1 | 0 |
| B2 | 100 |

TRANSACTION TABLE 206

| TXN ID | TYPE | AMOUNT | FROM | TO | FROM BALANCE | TO BALANCE |
|---|---|---|---|---|---|---|
| 1 | ACH | 100 | B1 | B1 | 100 | 100 |
| 2 | L-PAY | 100 | B1 | WALLET | 0 | 100 |
| 3 | ACH | 100 | B2 | B2 | 100 | 100 |
| 4 | L-PAY | 100 | B2 | WALLET | 100 | 200 |
| 5 | I-PAY | 125 | WALLET | I1 | 75 | 125 |

PAYMENT DISTRIBUTION TABLE 210

| LOAN ID | NOTE ID | PR. | INT. | B-TXN | I-TXN | STATUS | |
|---|---|---|---|---|---|---|---|
| L1 | 1 | 20 | 5 | 2 | 5 | DONE | ←350 |
| L1 | 2 | 20 | 5 | 2 | | | ←352 |
| L1 | 3 | 40 | 10 | 2 | | | ←354 |
| L2 | 4 | 80 | 20 | 4 | 5 | DONE | ←356 |

FIG. 4A

LOAN-TO-NOTES TABLE 200

| ORDER ID | LOAN ID | NOTE ID | AMOUNT | RECEIVED |
|---|---|---|---|---|
| 1 | L1 | N1 | 2500 | |
| 2 | L1 | N2 | 2500 | |
| 3 | L1 | N3 | 5000 | |
| 4 | L2 | N4 | 10000 | |

LOAN TABLE 202

| LOAN ID | AMOUNT |
|---|---|
| L1 | $10,000 |
| L2 | $10,000 |

ORDER TABLE 204

| ORDER ID | ACTOR | AMOUNT |
|---|---|---|
| 1 | I1 | 2500 |
| 2 | I2 | 2500 |
| 3 | I3 | 5000 |
| 4 | I1 | 10000 |

ACCOUNTS TABLE 208

| INVESTOR/ BORROWER | BALANCE |
|---|---|
| I1 | 125 |
| I2 | 125 |
| I3 | 200 |
| WALLET | 75 |
| B1 | 0 |
| B2 | 100 |

TRANSACTION TABLE 206

| TXN ID | TYPE | AMOUNT | FROM | TO | FROM BALANCE | TO BALANCE | |
|---|---|---|---|---|---|---|---|
| 1 | ACH | 100 | B1 | B1 | 100 | 100 | |
| 2 | L-PAY | 100 | B1 | WALLET | 0 | 100 | |
| 3 | ACH | 100 | B2 | B2 | 100 | 100 | |
| 4 | L-PAY | 100 | B2 | WALLET | 100 | 200 | |
| 5 | I-PAY | 125 | WALLET | I1 | 75 | 125 | ←310 |
| 6 | I-PAY | 25 | WALLET | I2 | 50 | 125 | ←312 |
| 7 | I-PAY | 50 | WALLET | I3 | 0 | 200 | |

PAYMENT DISTRIBUTION TABLE 210

| LOAN ID | NOTE ID | PR. | INT. | B-TXN | I-TXN | STATUS | |
|---|---|---|---|---|---|---|---|
| L1 | 1 | 20 | 5 | 2 | 5 | DONE | ←350 |
| L1 | 2 | 20 | 5 | 2 | 6 | DONE | ←352 |
| L1 | 3 | 40 | 10 | 2 | 7 | DONE | ←354 |
| L2 | 4 | 80 | 20 | 4 | 5 | DONE | ←356 |

FIG. 4B

REDUCING WORKLOAD USING TRANSACTION AGGREGATION

FIELD OF THE INVENTION

The present invention relates to computer-implemented systems and, more specifically, to reducing workload using transaction aggregation.

BACKGROUND

For many computer-implemented services, the number of transactions that must be performed by the service increases in a non-linear fashion relative to the number of entities using the system to perform transactions. For example, consider a service that performs many-to-many transactions between entities of type X and entities of type Y. Assuming that there are initially M entities of type X, and N entities of type Y, the service will be performing M×N transactions. Thus, the addition of a single additional entity of type X will result in N additional transactions, and the addition of a single entity of type Y will result in M additional transactions.

An example of a system the provides many-to-many services is a computerized loan system that allows multiple lenders to provide funding for one borrower, and multiple borrowers to receive funding from one lender. For the purpose of explanation, details shall be given herein relative to such a computerized loan system. However, the techniques described herein are not limited to any particular type of computerized system, and are applicable to any computerized service involving many-to-many relationships between entities engaging in transactions.

In a computerized loan system that that allows multiple lenders to provide funding for one borrower and multiple borrowers to receive funding from one lender, the number of transactions that need to be executed can be enormous. For example, for any given loan there may be N-investors, which results in N transactions for that loan every day. Payments distribution between two parties will affect the balance of both parties. If payment from borrower A for loan A is distributed to 10 investors, it will affect the account balance for 11 accounts (the 10 investor accounts once, and the borrower account 10 times). The same 10 investors could be receiving payments from Borrower B for loan B at the same time. To avoid the concurrency issues, today loan payments get processed sequentially. Processing M×N transactions sequentially will take more than a day to handle one day worth of payments as the volume grows. The many-to-many nature of the operations, combined with the need to serialize transactions, can result in a situation in which more transactions happen in a day than can be processed (or completed) on the same day.

Based on the foregoing, it is clearly desirable to reduce the workload of systems that perform transactions between entities that have many-to-many relationships. Without techniques for reducing such workload, the owners of such systems are forced to continually increase processing power through the purchase of expensive hardware in order to handle all of the transactions performed by their services.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 2 is a block diagram illustrating data structures that may be used to implement workload reduction through transaction aggregation, according to an embodiment;

FIG. 3A illustrates the data structures of FIG. 2 after a borrower B1 deposits $100;

FIG. 3B illustrates the data structures of FIG. 3A after borrower B1 applies the $100 to a loan L1 that has three investors I1, I2 and I3;

FIG. 3C illustrates the data structures of FIG. 3B after a second borrower B2 deposits $100;

FIG. 3D illustrates the data structures of FIG. 3C after borrower B2 applies the $100 to a loan L2 that has one investor I1;

FIG. 4A illustrates the data structures of FIG. 3D after an intermediary-to-many phase transaction has been executed to pay investor I1 for an aggregated amount;

FIG. 4B illustrates the data structures of FIG. 4A after transactions have been executed to pay investors I2 and I3.

DETAILED DESCRIPTION

Figure 1:
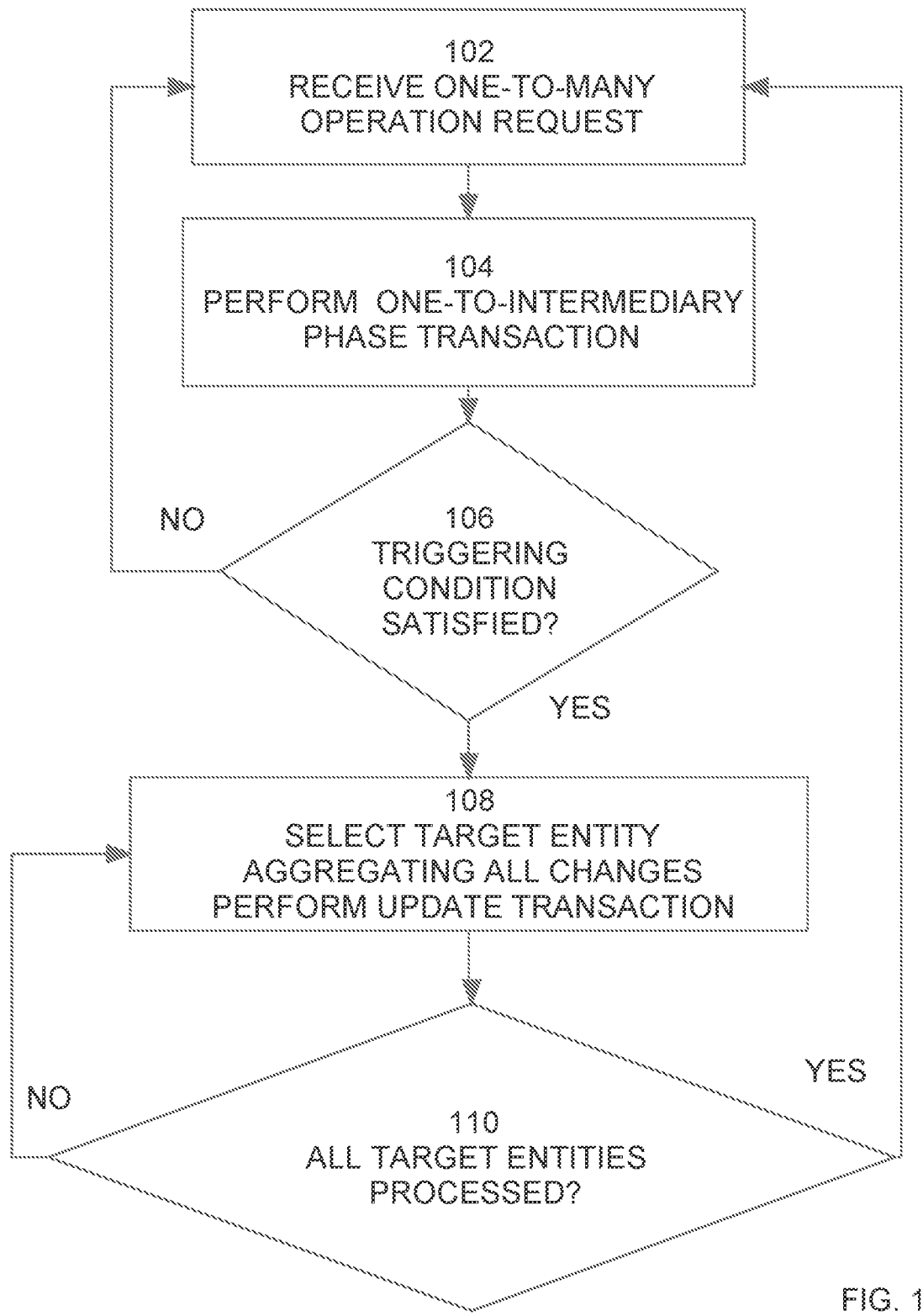
FIG. 1 is a flowchart showing steps for reducing workload by transaction aggregation, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

Techniques are provided for reducing the number of transactions required to perform operations for services that support many-to-many relationships between entities. According to one embodiment, a one-to-many operation that involves an entity of a first type and multiple entities of a second type is performed in two asynchronous phases: a one-to-intermediary phase and an intermediary-to-many phase. During the one-to-intermediary phase, a single transaction is performed between the entity of the first type and an intermediary. During the intermediary-to-many phase, a distinct transaction is performed between the intermediary and each of the entities of the second type that are involved in the one-to-many operation.

For example, assume that the entity of the first type is a borrower A, and that the entities of the second type are lenders 1, 2, and 3. Assume further that the one-to-many operation is a loan payment that requires funds from borrow A's account to be disbursed to the accounts of lenders 1, 2 and 3. In this example, during the one-to-intermediary phase, the total amount borrower A needs to pay lenders 1, 2 and 3 is transferred to an intermediary (e.g. a "holding wallet") in a single one-to-intermediary transaction. During the intermediary-to-many phase, the funds in the holding wallet are transferred to each of the lenders 1, 2, and 3, resulting in 3 intermediary-to-many phase transactions.

Performance of the two phases produces the same changes as would have been made if transactions had been performed between the entity of the first type and each of the entities of the second type. For example, after the two phases, the account of borrower A and the accounts of lenders 1, 2 and 3 all have the same balance as they would have had if the transactions had been performed in a single phase directly between the account of borrower A and the account of each of lenders 1, 2, and 3.

Because the intermediary-to-many phase is performed asynchronously relative to the one-to-intermediary phase, changes that need to be made for entities of the second type can accumulate at the intermediary. Consequently, the transaction performed during the intermediary-to-many phase for a given entity of the second type may aggregate all changes involving that entity.

For example, assume that lender 1 also invested in a loan with a borrower B, and that borrower B made a payment on that loan. Under these circumstances, after the one-to-intermediary phase, the holding wallet may include both a) an amount lender 1 receives from borrower A, and b) an amount that lender 1 receives from borrower B. Consequently, during the intermediary-to-many phase, the single transaction that updates lender A's account may increment the account for the aggregated total of all amounts in the holding wallet for lender 1. The fact that each entity of the first type only requires a single transaction during the intermediary-to-many phase, regardless of how many entities of the first type are involved with that entity, significantly reduces the number of transactions the system needs to perform.

The One-to-Intermediary Phase

As explained above, in a one-to-many operation involving one entity of a first type (ET1) and multiple entities of a second type (ET2s), instead of performing transactions directly between ET1 each of the ET2s, the one-to-many operation is split into two phases, the first of which is the one-to-intermediary phase. During the one-to-intermediary phase, a single transaction is performed between ET1 and the intermediary. For example, where ET1 is a borrower that is making a loan payment, the loan payment results in the virtual distribution of funds into an internal "holding wallet." The amount of money that is to be distributed to each investor in response to a loan payment is calculated and tracked.

For example, Borrower A may take out Loan A in the amount of $20,000. But this loan is not funded by one person. Instead, it is funded by independent individual investors, each of which loans Borrower A a portion of the loan principle. There may be 200 (or more, or fewer) investors, each loaning a portion of the loan. Each fragment of the loan may be for a different amount. Thus, Investor 1 may fund $1000 of the loan, while Investor 2 funds only $20 of the loan.

When the monthly payment is made for Loan A, a portion of that payment is to be distributed to each of the many investors that funded the loan. Instead of performing the transactions for each micro-distribution, an internal wallet keeps track of the amount owed to each investor, along with other data associated with the would-be transaction. Thus, in the present example, during the one-to-intermediary phase, a transaction would be executed to (a) decrement the balance of Borrower A's account by the amount of the monthly payment made by Borrower A on Loan A, and (b) increment the balance of the holding wallet by the amount of the monthly payment made by Borrower A on Loan A.

During the interval between the one-to-intermediary phase transaction and the corresponding intermediary-to-many phase transactions, other borrowers may be making payments on other loans. For example, when Borrower B makes a payment for a second loan (Loan B), then the same calculations occur. However, if there is an intersection between the investor groups for Loan A and Loan B, then during the one-to-intermediary phase the amounts to be distributed to the investors are updated to reflect the loan payment for Loan B. For example, if $20 from a $350 payment of Loan A and $200 from a $500 loan payment for Loan B are to be transferred to Investor 1, then the internal wallet for Investor 1 would be updated to $220. This reflects the amount owed to Investor 1 after both payments, instead of the first payment only, because the intermediary-to-many phase transactions associated with the first payment has not been executed yet.

According to one embodiment, the intermediary-to-many phase is deferred until a particular triggering condition occurs. The triggering condition may vary from implementation to implementation. In some situations, the triggering condition may be a time of day (e.g. 6 pm). In other situations, the triggering condition may be that a specified or determined number of payments have been processed. In one embodiment involving a many-to-many loan service, the triggering condition may be receipt of payment for 100,000 loans. Until the triggering condition is satisfied, each payment results in the updating and tracking of the wallet without performing intermediary-to-many transactions to update the accounts of the investors. For example, the wallet may be updated to reflect the calculations associated with the transactions for 100,000 loans, resulting in millions of would-be transactions reduced to calculations.

The Intermediary-to-Many Phase

Once the triggering condition occurs, the intermediary-to-many phase transactions are executed. In the context of a many-to-many loan service, a transaction is performed for each investor, representing the total amount of money they are owed as a result of all the payments associated with each loan for which they are an investor. Thus, in the example given above, a single transaction makes a payment of $220 into the account of Investor 1, even though that amount reflects payments from two different borrowers on two different loans.

By aggregating transactions, the number of distinct transactions required to provide the service is reduced from potentially (number of investors)×(number of borrowers) to (number of investors)+(number of borrowers), plus some calculations. This reduction in the number of transactions not only decreases the computing power required to perform the requisite updates, it also significantly reduces the storage space used to record the transactions. Specifically, in a database system that uses a redo log to record committed transactions, the amount of storage consumed by the redo log increases at a much slower rate using the transaction aggregation techniques described herein.

Process Overview

Referring to FIG. 1, it is a flowchart that illustrates a transaction aggregation technique, according to an embodiment. Initially, the system begins in a state in which only the one-to-intermediary phase of one-to-many operations are executed. Specifically, at step 102, during a first period of time in which a triggering condition has not been satisfied, the system receives a one-to-many operation request. For the purposes of explanation, it shall be assumed that the system receives a first request for a first one-to-many operation between a first entity (borrower A) and a plurality of first target entities (lenders 1, 2 and 3).

As explained above, such a request would require a first set of one or more updates to one or more values associated with the first entity (e.g. taking money out of borrower A's account for each lender), and a plurality of first target updates (e.g. paying each of lenders 1, 2 and 3). Each of those "first target updates" is to one or more values associated with a respective first target entity (e.g. lenders 1, 2 and 3).

At step 104, the system performs a one-to-intermediary phase transaction. In the present example, at step 104 the system would perform a first transaction that makes the first set of one or more updates (e.g. deducts the payments from borrower A's account) and a first corresponding set of one or more updates to one or more values associated with an intermediary (e.g. increments the holding wallet for the amount of the payments).

At step 106, the system determines whether the triggering condition was satisfied. As mentioned above, the triggering condition is the condition that causes the intermediary-to-many operations to be performed. The triggering conditions may be based on the time of day (e.g. at 5 pm), based on how many transactions have updated the wallet since the last intermediary-to-many phase, based on how much time has elapsed since the last intermediary-to-many phase, and/or any variety of other factors.

For the purpose of explanation, it shall be assumed that the triggering condition is not satisfied after borrow A makes a payment on loan A. Consequently, control passes from step 106 back to step 102. At step 102, the system may receive another request for a one-to-many operation. For example, the system may receive a second request for a second one-to-many operation between a second entity (e.g. borrower B) and a plurality of second target entities (lenders 1, 4 and 5). Similar to the first request, the second request requires one or more updates to one or more values associated with the second entity (updates to borrower B's account), and updates to one or more values associated with a respective second target entity (updates to the accounts of lenders 1, 4 and 5). Control the proceeds to step 104 where the system performs a second transaction that performs the second set of one or more updates (updates borrower B's account) and a second corresponding set of one or more updates to one or more values associated with the intermediary (updates to the holding wallet).

It should be noted that any number of one-to-intermediary phase transactions can be performed in parallel, so long as they correspond to different borrowers, because those transactions are not competing for write locks on the same data. Specifically, one-to-intermediary phase transactions for different borrowers update different borrower accounts. In addition, the one-to-intermediary phase transactions are not competing for locks on the data structure (e.g. table) that implements the holding wallet, because the updates made to the holding wallet are made by the insertion of new records (e.g. rows) rather than by updating pre-existing values within the wallet.

Control then proceeds to step 106 where the system detects whether the triggering condition is satisfied. For the purpose of explanation, it shall be assumed that the triggering condition is satisfied after receiving the second request. Consequently, control passes to step 108 and a second period begins. During the second period, steps 108 and 110 form a loop in which the system performs an update transaction for each target entity. In the present example, the target entities are lenders. Thus, the system performs an update transaction for each of the lenders 1, 2, 3, 4 and 5. Significantly, for each lender, the update transaction performed at step 108 causes the one or more values associated with the lender to reflect all payments made to the lender during the one-to-intermediary phase. That is, a single transaction is used to update each lender's account to reflect the aggregated amount paid to the lender by all borrowers. Thus, in the present example, the transaction that is executed for lender 1 aggregates the payment made to lender 1 by borrower A with the payment made to lender 1 by borrower B, and then updates lender 1's account based on the aggregate value. The transaction for any given lender also updates the holding wallet to indicate the payments made to the lender.

Many-to-Many Loan Service Example

FIG. 2 is a block diagram illustrating data structures that may be used to implement the transaction aggregation techniques described herein. For the purpose of illustration, an example shall be given in the context of a loan service that supports many-to-many relationships between investors (lenders) and borrowers. Referring to FIG. 2, the data structures include the following relational tables: loan-to-notes table 200, a loan table 202, an order table 204, a transaction table 206, an accounts table 208, and a payment distribution table 210. These tables may be managed by any appropriate database system, and the technique described herein are not limited to any particular type of database system.

For the purpose of explanation, it shall be assumed that a first loan (L1) for $10,000 has been made to a first borrower (B1) and a second loan (L2) for $10,000 has been made to a second borrower (B2). These loan amounts are reflected in loan table 202.

The source of the money for loans L1 and L2 are reflected in loan-to-notes table 200 and notes table 204. The Specifically, for loan L1:

$2500 came from investor I1 and is reflected in note N1,
$2500 came from investor I2 and is reflected in note N2, and
$5000 came from investor I3 and is reflected in note N3.

For loan L1, the entire $10,000 came from investor I1, as indicated in the loan-to-notes table 200 and the order table 204. It shall be assumed that the initial balance in the accounts of I1, I2, I3, B1 and B1 are respectively 0, 100, 150, 0, and 100, as illustrated in accounts table 208. Initially, transaction table 206 and payment distribution table 210 are empty.

For the purpose of explanation, it shall be assumed that borrower B1 adds $100 to his account from an outside account. The addition of the $100 causes the balance for B1 to increase to $100 in accounts table 208, as illustrated in FIG. 3A. In addition, a row 300 is added to transaction table 206 to record the transaction.

Assume that, after adding $100 to his account, borrower B1 makes a $100 payment on loan L1. Because investors I1, I2 and I3 invested in loan L1, the loan payment by B1 will ultimately result in three payments to the three investors. However, rather than immediately execute payments directly between B1 and each of investors I1, I2 and I3, a transaction is executed between B1 and an intermediary "wallet". The transaction between the intermediary and the wallet deducts the funds from B1's account, increments the wallet's account, and is recorded in row 302 of the transaction table 206, as illustrated in FIG. 3B.

In addition, in the same transaction (the one-to-intermediary transaction) that transfers money from borrower B1's account to the wallet account, payment distribution table 210 is updated to indicate who will ultimately get the funds that were just transferred to the wallet account. In the present example, loan B1 has three investors I1, I2, and I3 that will get paid in response to borrower B1's $100 loan payment. Consequently, loan payment distribution table 210 is updated with three rows 350, 352 and 354. Specifically, row 350 indicates that note N1 (of investor Up will be paid $25 ($20 principle, $5 interest) from the $100 payment made by borrower B. Row 352 indicates that note N2 (of investor I2) will be paid $25 ($20 principle, $5 interest) from the $100 payment made by borrower B. Finally, row 354 indicates that note N3 (of investor I3) will be paid $50 ($40 principle, $10 interest) from the $100 payment made by borrower B. Other tables (not shown) may also be updated to, for example, update values that indicate the total principle and interest that B1 has paid on loan L1.

Assume that, after borrower B1 makes the payment, the triggering condition to perform the intermediary-to-many phase operations has not been satisfied. For example, assume that the system begins the intermediary-to-many phase at 5 pm each day, and that B1 makes the payment at 3 pm. Consequently, the system does not actually perform the payment distribution by updating the accounts table 208. Rather, prior to the triggering condition, the system merely records what the payment distribution should be in payment distribution table 210.

Assume that at 4 pm, the other borrower B2 transfers $100 to B2's account, and makes a payment on loan L2. The transfer of $100 to B2's account is reflected in row 304 of FIG. 3C.

After adding $100 to his account, borrower B2 makes a $100 payment on loan L2. Rather than immediately execute payments directly between B2 and investor I1 of loan L2, a transaction is executed between B2 and the intermediary "wallet". The transaction between the intermediary and the wallet deducts the funds from B2's account, increments the wallet's account, and is recorded in row 306 of the transaction table 206, as illustrated in FIG. 3D.

In addition, in the same transaction that transfers money from borrower B2's account to the wallet account, payment distribution table 210 is updated to indicate who will ultimately get the funds that were just transferred to the wallet account. In the present example, loan B2 has one investor (I1) that will get paid in response to borrower B2's $100 loan payment. Consequently, loan payment distribution table 210 is updated with one row 356. Row 356 indicates that note N4 (of investor I1) will be paid $100 ($80 principle, $20 interest) from the $100 payment made by borrower B. Other tables (not shown) may also be updated to, for example, update values that indicate the total principle and interest that B2 has paid on loan L2.

Until the triggering condition is satisfied (in this example, prior to 5 pm), any number of additional loan payments may be made. In each case, the account of the person making the payment is updated, the wallet balance is updated, and records are added to the payment distribution table 210, but no payments are actually applied (i.e. no investor accounts are updated). Once the triggering condition is satisfied, transactions are executed to apply the payments to the investor accounts. However, rather than execute one transaction for each row of the payment distribution table 210, one transaction is executed for each investor account for which any updates are present. In the one transaction for an investor account, all payment amounts to that investor are aggregated. Thus, even though a single investor is being paid on loans to 100 different borrowers, a single transaction updates the investor's account with the aggregate total of those payments.

In the present example, payment distribution table 210 has unprocessed records for three investors (I1, I2, and I3). Consequently, when the triggering condition is satisfied (e.g. at 5 pm), three transactions are performed. In the first transaction of the intermediary-to-many phase, a transaction (TXN 5) sums to total amount to be paid to investor I1, increments the account of investor I1, and changes the status of the corresponding rows in the payment distribution table 210 to "done".

Referring to FIG. 4A, it illustrates the state of the tables after execution of TXN 5 that applies the payments to investor I1's account. Specifically, a row 308 is added to transaction table 206 to indicate that $125 (the aggregate of the values from rows 350 and 356 of the payment distribution table 210) is paid from the wallet account to the account of I1. Consequently, within accounts table 208, the balance of I1 is now $125, while the balance of the wallet account is $75. In addition, rows 350 and 356 of the payment distribution table 210 are marked as "done".

The intermediary-to-many phase transactions for investors I2 and I3 would proceed in a similar fashion. As illustrated in FIG. 4B, the transaction TX6 for investor I2 results in a row 310 in the transaction table 206, a $25 increase I2's balance (now $125), a corresponding decrease in the wallet's balance (down to $50), and row 352 marked as "done". The transaction TX7 for investor I3 results in a row 312 in the transaction table 206, a $50 increase I3's balance (now $200), a corresponding decrease in the wallet's balance (down to $0), and row 354 marked as "done".

Other Intermediary-to-Many Phase Transactions

In the example given above, the intermediary-to-many phase involved performing a single transaction per target entity (e.g. investor). Depending on the nature and complexity of the service, the intermediary-to-many phase may involve additional transactions per target entity. For example, each transaction that pays an investor from the wallet account may trigger another transaction that causes the investor's account to pay a service fee to a service account.

For example, TXN 5 that pays I1 $125 from the wallet account may trigger an additional transaction that pays a loan service account a percentage of the amount paid to I1. However, even in situations where numerous transactions are executed for each investor during the intermediary-to-many phase, the number of transactions is not affected by the number of payments made to the investor, because all such payments are aggregated and applied in a single transaction. Thus, a non-linear proliferation of transactions is avoided.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
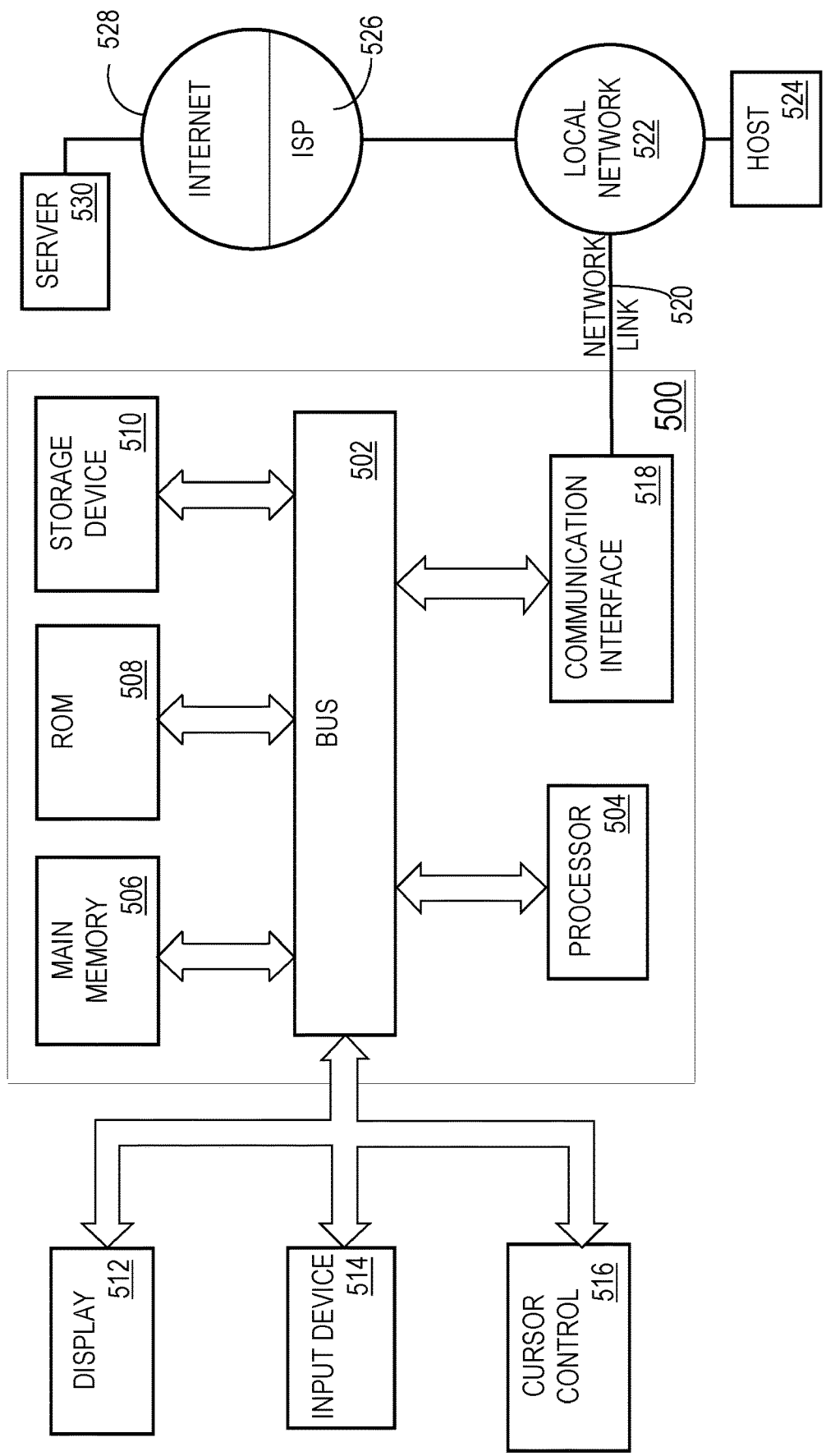
FIG. 5 is a block diagram of a computer system that may be used to implement the workload reduction techniques described herein.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for reducing workload of a computer system that performs transactions between entities that have many-to-many relationships by aggregating transactions in the computing system, comprising:
   during a one-to-intermediary phase in which a triggering condition has not been satisfied:
      receiving, at a database system, a first request for a first one-to-many operation between a first entity and a plurality of first target entities;
      wherein the plurality of first target entities are a subset of a set of target entities;
      wherein the first request requires:
         a first set of one or more updates to one or more values, stored in the database system, associated with the first entity; and
         a plurality of first target updates, wherein each first target update of the plurality of first target updates is to one or more values, stored in the database system, associated with a respective first target entity of the plurality of first target entities; and
      in a first transaction, the database system performing the first set of one or more updates, to values stored in the database system, and a first corresponding set of one or more updates to one or more values, stored in the database system, associated with an intermediary;
      receiving, at the database system, a second request for a second one-to-many operation between a second entity and a plurality of second target entities;
      wherein the plurality of second target entities are a subset of the set of target entities;
      wherein the second request requires:
         a second set of one or more updates to one or more values, stored in the database system, associated with the second entity; and
         a plurality of second target updates, wherein each second target update of the plurality of second target updates is to one or more values, stored in the database system, associated with a respective second target entity of the plurality of second target entities; and
      in a second transaction, the database system performing the second set of one or more updates, to values stored in the database system, and a second corresponding set of one or more updates to one or more values, stored in the database system, associated with the intermediary;
   wherein one or more common target entities are common to both the plurality of first target entities and the plurality of second target entities;
   detecting that the triggering condition is satisfied;
   during an intermediary-to-many phase after detecting that the triggering condition is satisfied:
      performing, by the database system, a single transaction for each target entity in the set of target entities to:
         cause the one or more values, stored in the database system, associated with each respective first target entity to reflect the plurality of first target updates;
         cause the one or more values, stored in the database system, associated with each respective second target entity to reflect the plurality of second target updates; and
         update one or more values, stored in the database system, associated with the intermediary to reflect performance of the plurality of first target updates and performance of the plurality of second target updates;
   wherein the single transaction performed, by the database system, for each common target entity performs an update that aggregates the first target update that corresponds to the common target entity with the second target update that corresponds to the common target entity.

2. The method of claim 1 wherein the triggering condition is a particular time of day.

3. The method of claim 1 wherein the triggering condition is expiration of a particular amount of time.

4. The method of claim 1 wherein the triggering condition is based on how many one-to-many operation requests are received.

5. The method of claim 1 wherein:
   the first entity is a first borrower and the plurality of first target entities is a first plurality of lenders associated with a first loan to the first borrower;
   the second entity is a second borrower and the plurality of second target entities is a second plurality of lenders associated with a second loan to the second borrower; and
   the one or more common target entities includes a lender that is associated with both the first loan and the second loan.

6. The method of claim 1 wherein:
   the first transaction stores, in a particular table, a first record that indicates a first particular update that corresponds to a particular common target entity;
   the second transaction stores, in the particular table, a second record that indicates a second particular update that corresponds to the particular common target entity; and
   the single transaction performed for the particular common target entity reads the first record and the second record from the particular table and performs an update that aggregates the first particular update and the second particular update.

7. The method of claim 1 wherein the first transaction stores, in a particular table, a distinct record for each first target update of the plurality of first target updates.

8. The method of claim 7 wherein the second transaction stores, in the particular table, a distinct record for each second target update of the plurality of second target updates.

9. The method of claim 8 wherein performing a single transaction for each target entity in the set of target entities comprises:
  determining the set of target entities based on records in the particular table that have not been processed; and
  during the single transaction for each target entity in the set of target entities, aggregating values from records in the particular table that correspond to the target entity.

10. One or more non-transitory storage media storing instructions for reducing workload of a computer system that performs transactions between entities that have many-to-many relationships by aggregating transactions in the computing system, the instructions comprising instructions which, when executed by one or more computing devices, cause:
  during a one-to-intermediary phase in which a triggering condition has not been satisfied:
    receiving, at a database system, a first request for a first one-to-many operation between a first entity and a plurality of first target entities;
    wherein the plurality of first target entities are a subset of a set of target entities;
    wherein the first request requires:
      a first set of one or more updates to one or more values, stored in the database system, associated with the first entity; and
      a plurality of first target updates, wherein each first target update of the plurality of first target updates is to one or more values, stored in the database system, associated with a respective first target entity of the plurality of first target entities; and
    in a first transaction, the database system performing the first set of one or more updates, to values stored in the database system, and a first corresponding set of one or more updates to one or more values, stored in the database system, associated with an intermediary;
    receiving, at the database system, a second request for a second one-to-many operation between a second entity and a plurality of second target entities;
    wherein the plurality of second target entities are a subset of the set of target entities;
    wherein the second request requires:
      a second set of one or more updates to one or more values, stored in the database system, associated with the second entity; and
      a plurality of second target updates, wherein each second target update of the plurality of second target updates is to one or more values, stored in the database system, associated with a respective second target entity of the plurality of second target entities; and
    in a second transaction, the database system performing the second set of one or more updates, to values stored in the database system, and a second corresponding set of one or more updates to one or more values, stored in the database system, associated with the intermediary;
  wherein one or more common target entities are common to both the plurality of first target entities and the plurality of second target entities;
  detecting that the triggering condition is satisfied;
  during an intermediary-to-many phase after detecting that the triggering condition is satisfied:
    performing, by the database system, a single transaction for each target entity in the set of target entities to:
      cause the one or more values, stored in the database system, associated with each respective first target entity to reflect the plurality of first target updates;
      cause the one or more values, stored in the database system, associated with each respective second target entity to reflect the plurality of second target updates; and
      update one or more values, stored in the database system, associated with the intermediary to reflect performance of the plurality of first target updates and performance of the plurality of second target updates;
    wherein the single transaction performed, by the database system, for each common target entity performs an update that aggregates the first target update that corresponds to the common target entity with the second target update that corresponds to the common target entity.

11. The one or more non-transitory storage media of claim 10 wherein the triggering condition is a particular time of day.

12. The one or more non-transitory storage media of claim 10 wherein the triggering condition is expiration of a particular amount of time.

13. The one or more non-transitory storage media of claim 10 wherein the triggering condition is based on how many one-to-many operation requests are received.

14. The one or more non-transitory storage media of claim 10 wherein:
  the first entity is a first borrower and the plurality of first target entities is a first plurality of lenders associated with a first loan to the first borrower;
  the second entity is a second borrower and the plurality of second target entities is a second plurality of lenders associated with a second loan to the second borrower; and
  the one or more common target entities includes a lender that is associated with both the first loan and the second loan.

15. The one or more non-transitory storage media of claim 10 wherein:
  the first transaction stores, in a particular table, a first record that indicates a first particular update that corresponds to a particular common target entity;
  the second transaction stores, in the particular table, a second record that indicates a second particular update that corresponds to the particular common target entity; and
  the single transaction performed for the particular common target entity reads the first record and the second record from the particular table and performs an update that aggregates the first particular update and the second particular update.

16. The one or more non-transitory storage media of claim 10 wherein the first transaction stores, in a particular table, a distinct record for each first target update of the plurality of first target updates.

17. The one or more non-transitory storage media of claim 16 wherein the second transaction stores, in the particular table, a distinct record for each second target update of the plurality of second target updates.

18. The one or more non-transitory storage media of claim 17 wherein performing a single transaction for each target entity in the set of target entities comprises:
  determining the set of target entities based on records in the particular table that have not been processed; and during the single transaction for each target entity in the set of target entities, aggregating values from records in the particular table that correspond to the target entity.

\* \* \* \* \*